(12) United States Patent
Susnjara

(10) Patent No.: US 10,059,051 B2
(45) Date of Patent: *Aug. 28, 2018

(54) MACHINE FOR FORMING THERMOPLASTIC ARTICLES AND DEVICE UTILIZED IN THE PRODUCTION THEREOF

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,579

(22) Filed: Jun. 19, 2017

(65) Prior Publication Data

US 2017/0326804 A1 Nov. 16, 2017

Related U.S. Application Data

(63) Continuation of application No. 14/678,286, filed on Apr. 3, 2015, now Pat. No. 9,707,721.

(51) Int. Cl.
*B29C 64/386* (2017.01)
*B29C 67/00* (2017.01)
(Continued)

(52) U.S. Cl.
CPC ........ *B29C 64/386* (2017.08); *B29C 47/0002* (2013.01); *B29C 47/0866* (2013.01);
(Continued)

(58) Field of Classification Search
CPC .............. B29C 64/386; B29C 47/0002; B29C 47/0866; B33Y 10/00; B33Y 30/00; B33Y 50/00
See application file for complete search history.

(56) References Cited

U.S. PATENT DOCUMENTS 5,808,888 A * 9/1998 Susnjara .............. G05B 19/423
700/195
5,902,537 A * 5/1999 Almquist ................ B29C 41/12
264/308
(Continued)

FOREIGN PATENT DOCUMENTS

EP 2 610 417 A1 7/2013

OTHER PUBLICATIONS

International Search Report and Written Opinion issued in International App. No. PCT/US2016/025615, dated Aug. 16, 2016 (12 pages).
(Continued)

*Primary Examiner* — Jacob T Minskey
*Assistant Examiner* — Melody Tsui
(74) *Attorney, Agent, or Firm* — Bookoff McAndrews, PLLC

(57) ABSTRACT

An assembly mountable on a machine including a gantry displaceable along an x-axis, a carriage mounted on such gantry displaceable along the y-axis, provided with means for extruding a beam of molten thermoplastic material, a tool carrier mounted on such carriage displaceable along a z-axis, a tool holder mounted on such tool carrier displaceable about a z-axis, a tool support shaft provided with an axis disposed in an x-y plane journalled in such tool holder and rotatable about the axis thereof, a dispenser conduit mounted on such shaft, perpendicular to such shaft axis, means on such dispenser conduit for ejection of a beam of molten thermoplastic material and a flexible hose with a first end supported on such carrier forming a rotary union with such material extrusion means, and a second end communicating with an inlet of such dispenser conduit.

20 Claims, 6 Drawing Sheets

(51) Int. Cl.
*B29C 47/00* (2006.01)
*B29C 47/08* (2006.01)
*B29C 64/255* (2017.01)
*B29C 64/106* (2017.01)
*B33Y 50/02* (2015.01)
*B33Y 10/00* (2015.01)
*B33Y 30/00* (2015.01)
*B33Y 50/00* (2015.01)
*B29K 101/12* (2006.01)
*B29C 64/307* (2017.01)
*B29C 64/00* (2017.01)
*B29C 64/20* (2017.01)

(52) U.S. Cl.
CPC .......... *B29C 64/106* (2017.08); *B29C 64/255* (2017.08); *B29C 67/0055* (2013.01); *B29C 67/0088* (2013.01); *B29C 64/00* (2017.08); *B29C 64/20* (2017.08); *B29C 64/307* (2017.08); *B29C 67/0051* (2013.01); *B29C 67/0085* (2013.01); *B29K 2101/12* (2013.01); *B33Y 10/00* (2014.12); *B33Y 30/00* (2014.12); *B33Y 50/00* (2014.12); *B33Y 50/02* (2014.12)

(56) References Cited

U.S. PATENT DOCUMENTS

| | | | |
|---|---|---|---|
| 6,189,622 B1 * | 2/2001 | Audet | A62C 31/02 |
| | | | 169/16 |
| 6,350,222 B2 | 2/2002 | Susnjara | |
| 9,707,721 B2 * | 7/2017 | Susnjara | B29C 67/0088 |
| 2010/0318222 A1 | 12/2010 | Khoshnevis | |
| 2013/0209600 A1 * | 8/2013 | Tow | G01N 35/1011 |
| | | | 425/375 |
| 2015/0093465 A1 | 4/2015 | Page | |
| 2016/0271871 A1 * | 9/2016 | Lee | B29C 67/0055 |

OTHER PUBLICATIONS

Carsten: "Umrüstung CNC Fräse nach 3D Drucker? (Temporär)," posted online Nov. 24, 2013, pp. 1-4, XP002743768, http://www.mikrocontroller.net/topic/315745, originally retrieved Aug. 27, 2015 (including English Machine Translation).

* cited by examiner

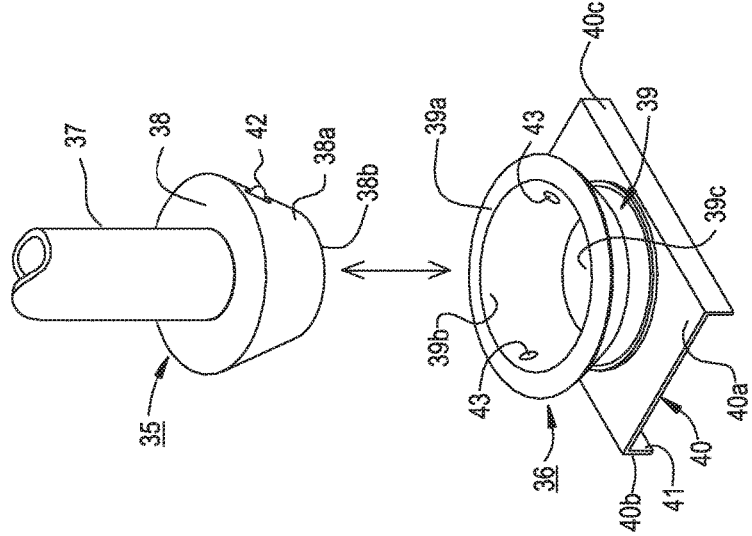
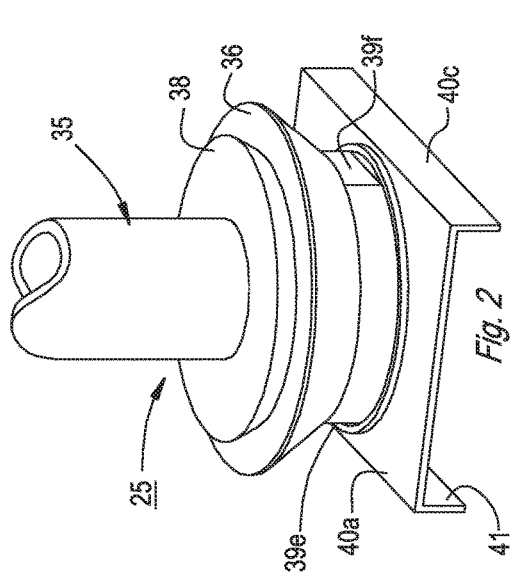
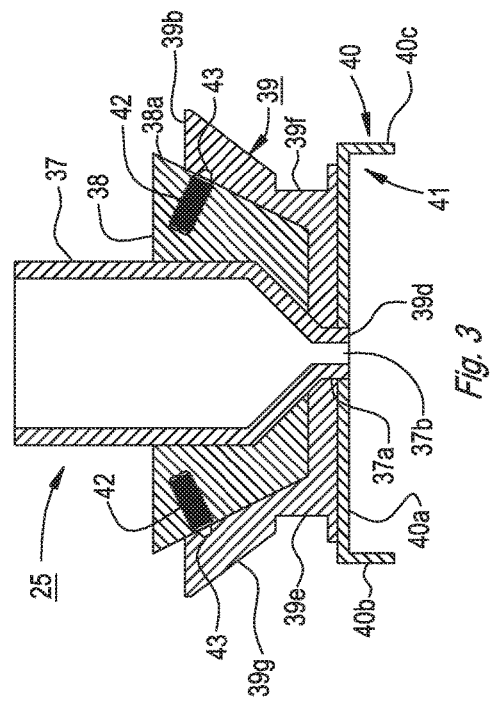

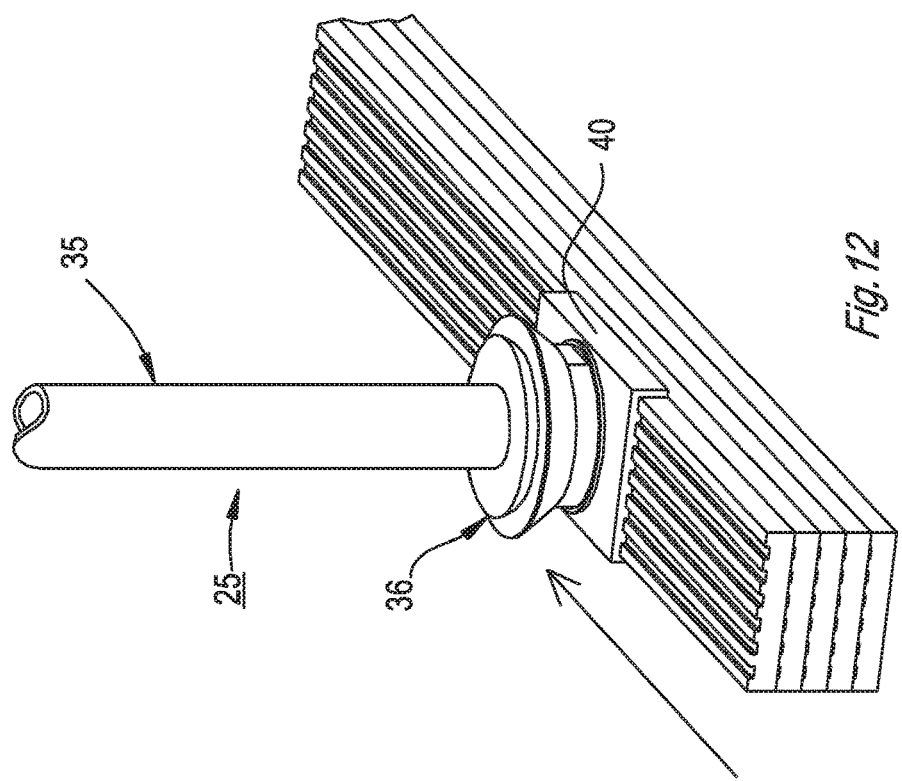
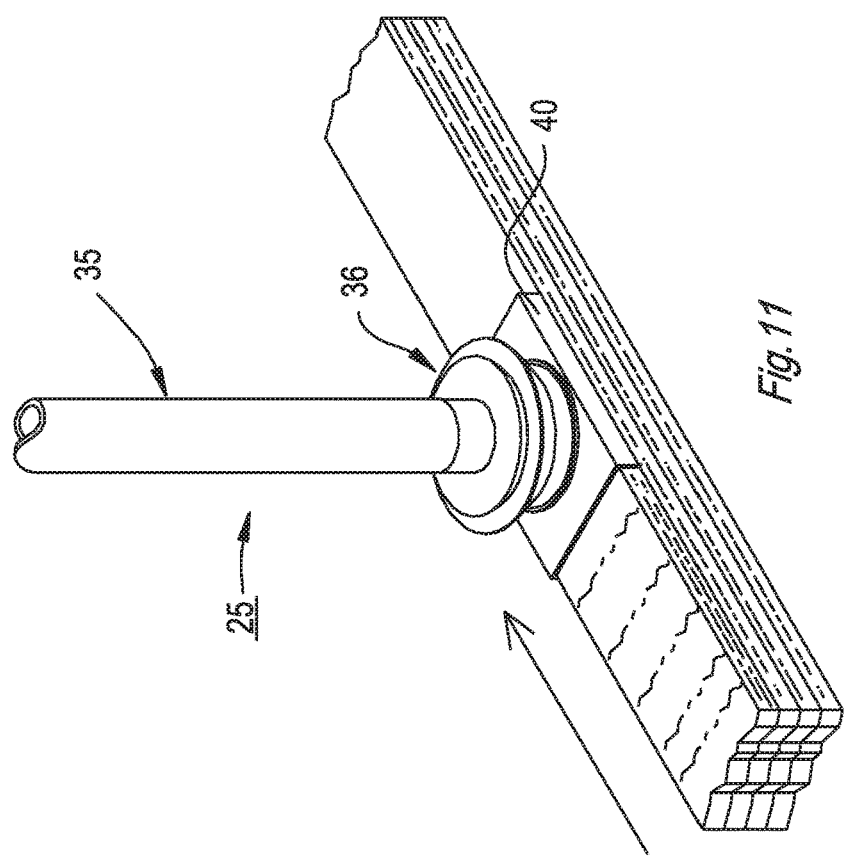

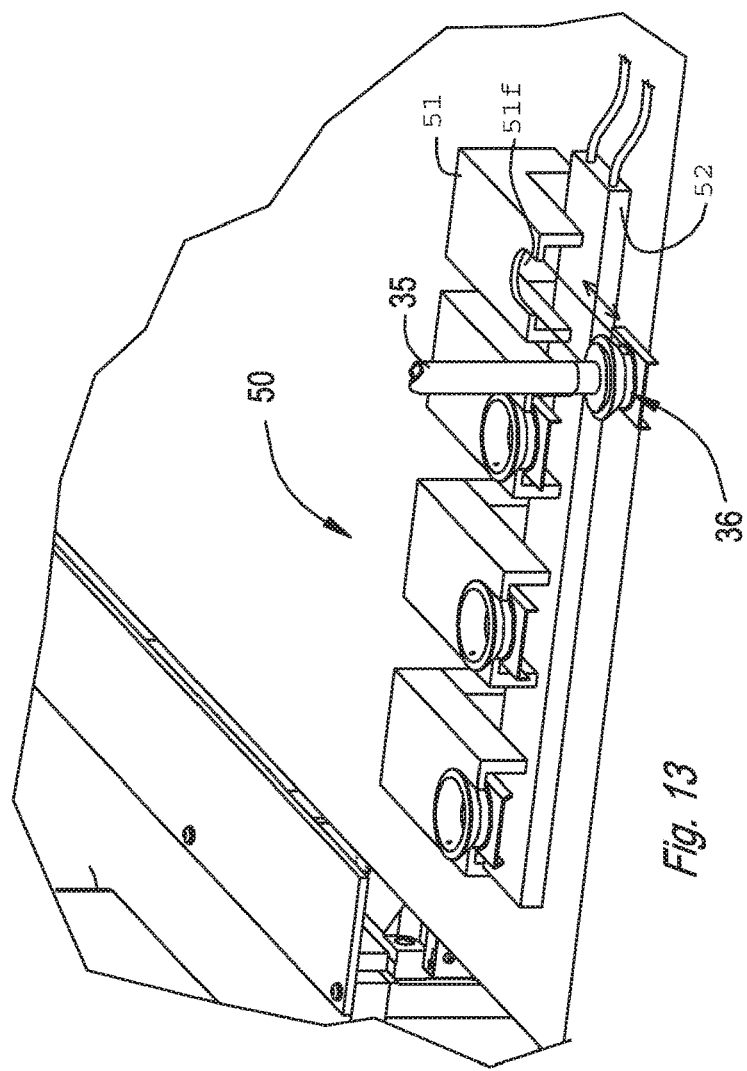
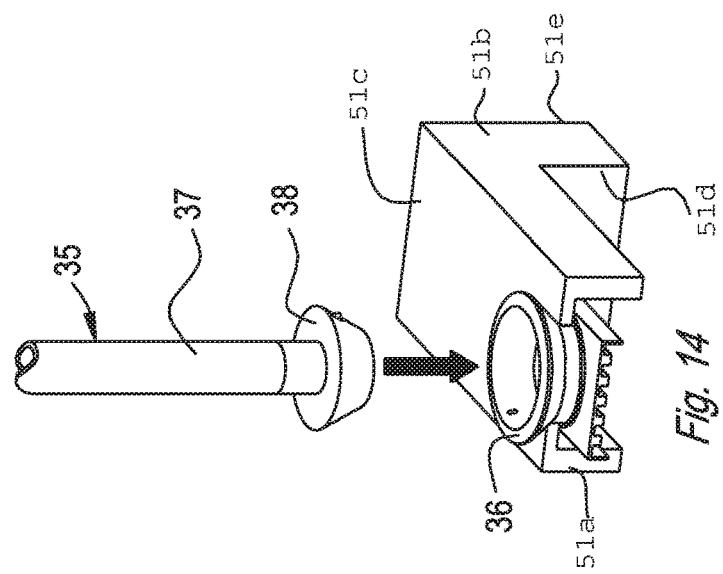

MACHINE FOR FORMING THERMOPLASTIC ARTICLES AND DEVICE UTILIZED IN THE PRODUCTION THEREOF

CROSS-REFERENCE TO RELATED APPLICATIONS

This application is a continuation application of U.S. application Ser. No. 14/678,286, filed Apr. 3, 2015, now U.S. Pat. No. 9,707,721, the entirety of which is herein incorporated by reference.

This invention relates to a CNC machine for producing products of selected configurations and more particularly for producing such products by means of an extrusion method. This invention further provides for an improved extrusion device for such machine.

BACKGROUND OF THE INVENTION

In the prior art, there has been developed a machine for forming products by means of extruding pliable beads of a heated thermoplastic material in various strata to form a roughly configured object which then is machined to produce a finished configuration. In the practice of such process, it has been found that in extruding such material in thin beads, the machine time becomes lengthy, diminishing productivity. It further has been found that by increasing the thickness of the extruded beads in an attempt to improve productivity, additional adverse effects result including a lack of cohesion of engaging bead segments and an excess of material requiring additional machining for removal. Accordingly, the principal object of the present invention is to provide a machine of the type described which is functional in forming products by an extrusion process to a rough configuration approaching a final configuration, requiring a minimal amount of machining to produce the desired configuration thereby improving productivity.

BRIEF DESCRIPTION OF THE INVENTION

The principal object of the present invention is achieved by a device mountable on a tool holder of a CNC machine provided with a worktable surface disposed in an x-y plane, and one of a means for displacing such holder along x, y and z-axes and a means for displacing such holder along y and z-axes and such worktable surface along the x-axis, functional in applying stratified layers of a heated thermoplastic material onto such worktable surface to form a selectively configured body, generally including means mountable on such holder for extruding a bead of such material along the z-axis toward such worktable surface; and means dependable relative to such extruding means including a channel disposed in the x-y plane, provided with an inlet communicable with an outlet of such extruding means, and an open lower side. The cross-sectional configuration or profile of such channel may vary by means of the depth of such channel, the configuration of an upper wall thereof and the number and configurations of one or more side walls thereof.

BRIEF DESCRIPTION OF THE DRAWINGS

FIG. 2 is an enlarged, perspective view of a material applicator device mounted on the tool holder of the machine in FIG. 1;

FIG. 3 is a vertical, cross-sectional view of the device shown in FIG. 2;

FIG. 4 is a perspective view of the device shown in FIGS. 2 and 3, illustrating the components thereof in spaced relation and depicting their manner of union;

FIG. 11 is a perspective view of the device shown in FIGS. 2 through 4, illustrating the manner of forming a strata of plies in the course of configuring a rough form of a selected product;

FIG. 12 is a view similar to the view shown in FIG. 11 wherein the device is provided with an alternate interior configuration of the material applying channel as provided by the channel cross-sectional configuration shown in FIG. 8;

FIG. 13 is a perspective view of a storage rack provided on the worktable of the machine shown in FIG. 1, accommodating a number of applicator components as shown in FIGS. 2 through 4, each provided with a material applying channel having a different cross-sectional configuration; and FIG. 14 is a perspective view of a holding bracket of the rack shown in FIG. 13, illustrating the manner in which a detachable applicator component of the device shown in FIGS. 2 through 4, may be detached and stored therein.

DETAILED DESCRIPTION OF THE PREFERRED EMBODIMENT OF THE INVENTION

Figure 1:
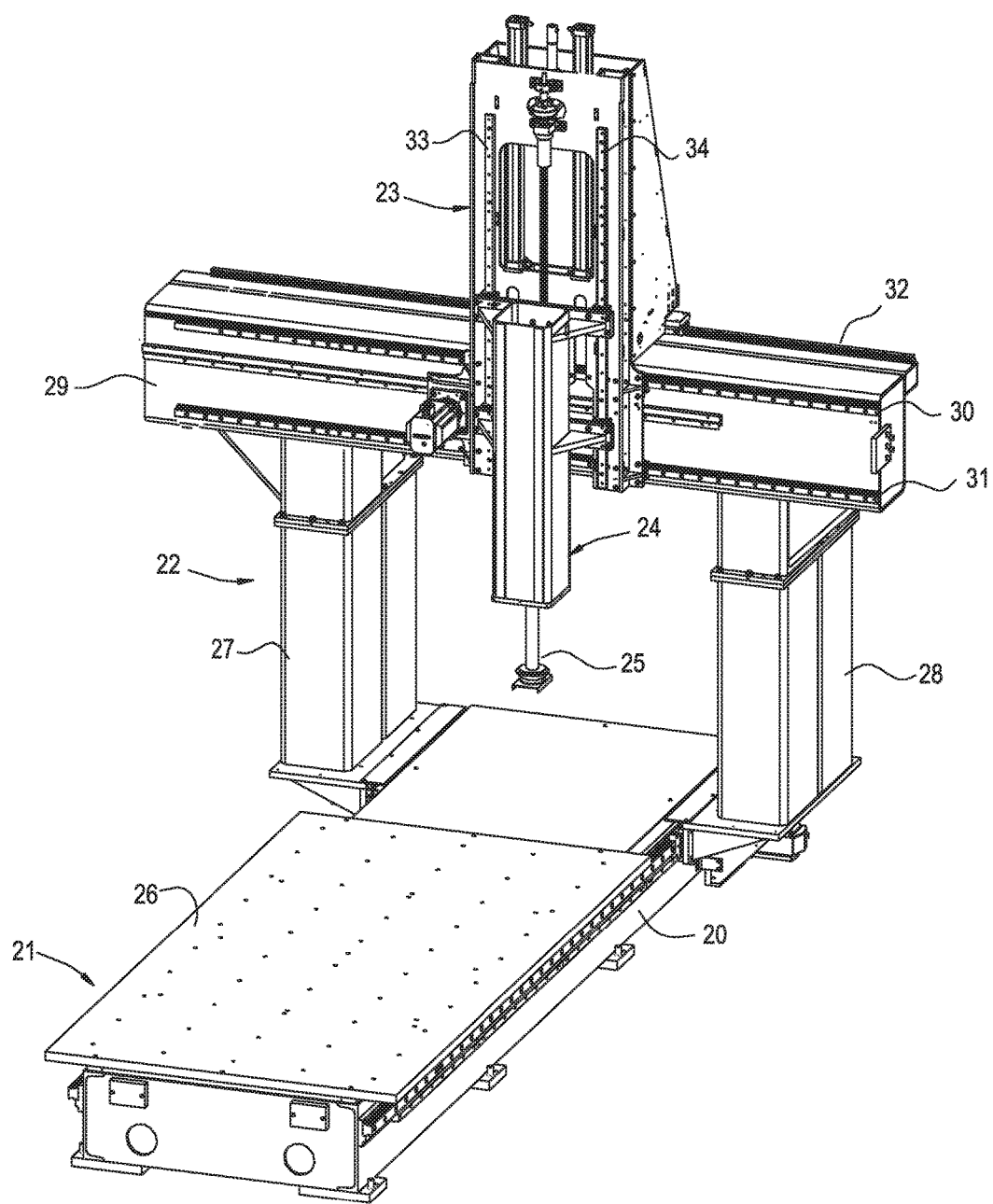
FIG. 1 is a perspective view of a CNC machine incorporating the present invention.

Referring to FIG. 1 of the drawings, there is illustrated a CNC machine which embodies the present invention. Such machine includes a bed 20, a worktable 21 mounted on a set of guide rails provided on bed 20, a gantry 22 mounted on bed 20, a carriage 23 mounted on the gantry and a tool holder 24 mounted on the carriage, provided with a device 25 for extruding, shaping and applying a bead of molten thermoplastic material. Worktable 21 is provided with a planar support surface 26 lying in an x-y plane and is displaceable along the y-axis by means of a pair of threaded members driven by a pair of servomotors. Gantry 22 includes a pair of laterally spaced leg portions 27 and 28 rigidly supported on the machine bed and a transversely disposed portion 29 supported on the upper ends of such leg portions. A pair of vertically spaced, transversely disposed guide rails 30 and 31 are provided on the forwardly facing surface of gantry transverse portion 29, and an additional transversely disposed guide rail 32 is provided on an upper surface thereof. Carriage 23 is supported on transverse guide rails 30, 31 and 32 and displaceable along the x-axis by means of a threaded member driven by a servomotor. Similarly, toolholder 24 is mounted on a set of vertical guide rails 33 and 34 mounted on the front face of carriage 23, and is displaceable along the z-axis by means of a threaded member driven by a servomotor. In the conventional manner, such servomotors are operated by a control computer pursuant to the execution of a selected program inputted into such computer.

As best illustrated in FIGS. 2 through 4, device 25 includes a pliable material extruding component 35 and a detachable pliable, extruded material applicator component 36. Component 35 includes a conduit 37 mounted on the tool holder and connected at one end thereof to a source of a heated, pliable thermostatic material provided on or in proximity to the machine, narrowing into a nozzle section 37a providing an outlet 37b, and an annular appendage 38 provided with a frusto-conically configured side wall 38a and an annular bottom wall 38b.

Applicator component 36 includes an upper receptor segment 39 and a lower shaping segment 40. As best shown in FIGS. 3 and 4, segment 39 includes an upper, annular surface 39a encircling an axially disposed recess defined by a frusto-conically configured side wall 39b and a annular bottom wall 39c provided with an axially disposed opening 39d. The outer surface of segment 39 further is provided with a pair of transversely spaced, parallel guide slots 39e and 39f which lie in an x-y plane perpendicular to the axis of the recess defined by side wall 39b and bottom wall 39c.

Lower shaping segment 40 of component 36 is fairly elongated and has a U-shaped cross-sectional configuration including a planar base portion 40a and a pair of transversely spaced depending portions 40b and 40c defining a channel 41 disposed perpendicular relative to the axis of the recess defined by inner walls 39b and 39c of segment 39. Base portion 40a further is provided with an opening communicating with axially disposed opening 39d in segment 39.

As best illustrated in FIGS. 3 and 4, the lower surface of appendage 38 and the surfaces defining the recess in segment 39 are configured so that appendage 38 may be nested in the recess of segment 39 with bottom surface 38b of appendage 38 seated on bottom wall 39c of segment 39, side surface 38a engaging sidewall 39b and nozzle 37a inserted through opening 39d to intercommunicate opening 37b of nozzle section 37a through opening 39d with the interior of segment 40. Such nesting provides for heated, pliable thermoplastic material extruded by extruder segment 35, to flow into and be shaped by the interior cross-sectional configuration of shaping segment 40 thereby applying a segment of a bead of heated material on the worktable surface of the machine or atop a formed bead of material pursuant to a programmed procedure in forming a configured object. Such nested relationship of segments 35 and 36 is intended to be detachable as provided by a set of spring-loaded ball plungers 42, 42 spaced 180° apart, provided in appendage 38, cooperable with mating recesses 43, 43 provided in surface 39b of the recess in segment 39. Upon being vertically aligned as shown in FIG. 4, the appendage portion of segment 37 may be inserted into the recess of segment 36, and be detachable secured in an operable position with respect to segment 35.

Figure 5:
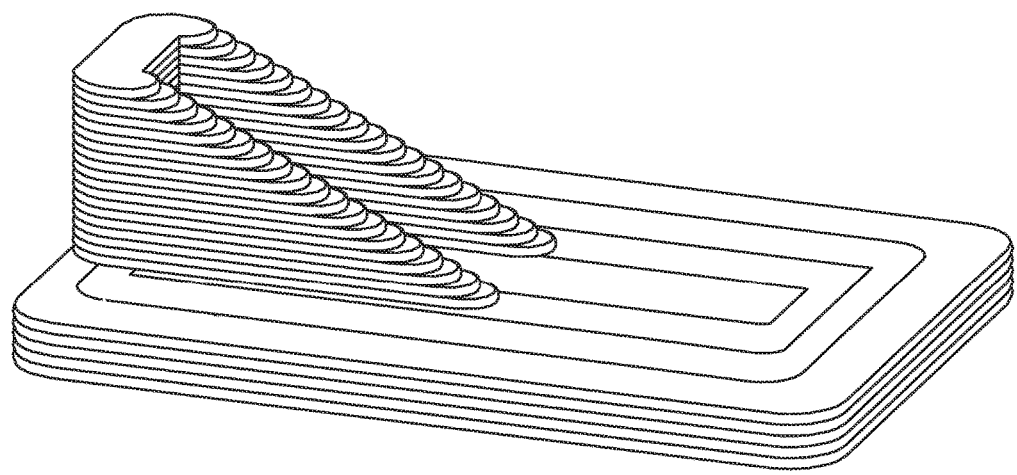
FIG. 5 is a perspective view of a rough form of a prospective product, formed by the machine and applicator device shown in FIGS. 1 through 4, illustrating a strata of plies of thermoplastic material applied by such device.
Figure 6:
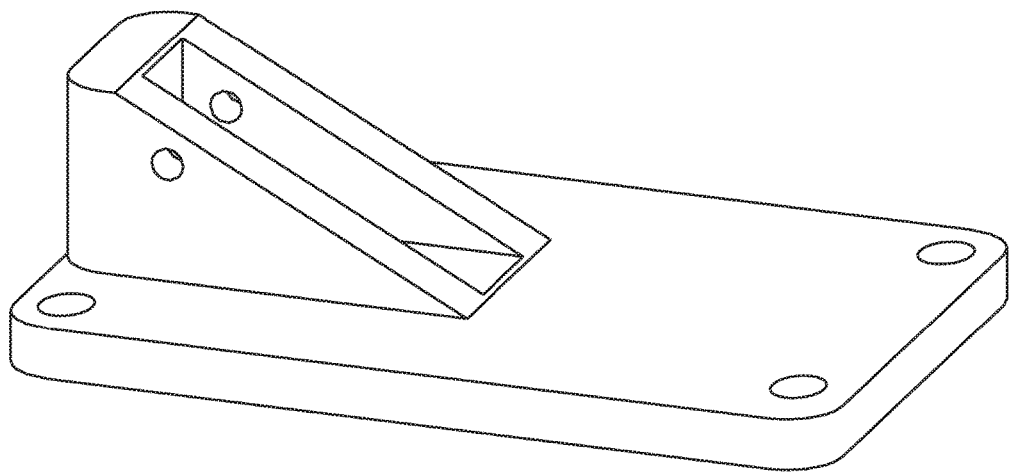
FIG. 6 is a view of the formed product shown in FIG. 5, having been machined to its final configuration.

The essential function of segment 40 is to shape heated, thermoplastic material received from segment 35, into plies which may be applied in layers to form a strata of such plies, roughly configured in the form shown in FIG. 5, minimally greater than the intended configuration of a final product as shown in FIG. 6. Such plies are formed sufficiently thin so as to readily fuse with abutting plies yet sufficiently thick so as to minimize subsequent machining in forming such final product. The plies are of a suitable cross-sectional configuration so as to facilitate the formation of a rough configuration close to the final configuration of the intended product, thus minimizing the amount of machining of the roughly formed product into the final product.

Figure 7:
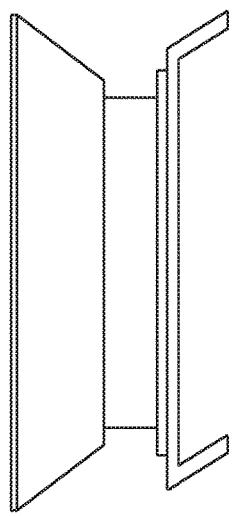
FIGS. 7 through 10 are enlarged elevational views of the material shaping components of the device shown in FIGS. 2 through 4, illustrating various available interior configurations of the channel portions thereof.
Figure 9:
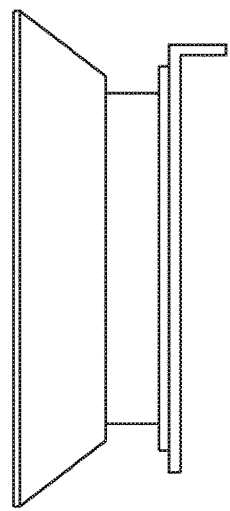
Figure 8:
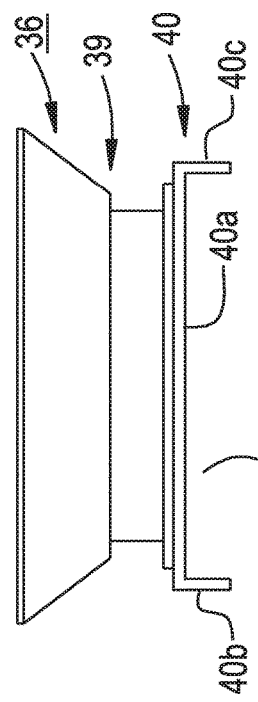
Figure 10:
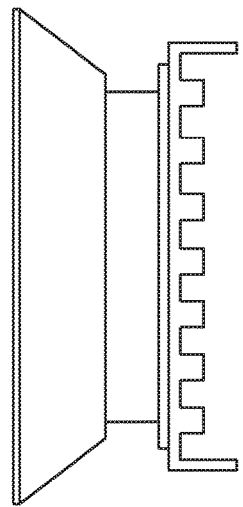

Referring to FIGS. 5 through 10, there is illustrated several material shaping segments providing variously configured ply forming channels which are effective in producing a sufficiently thin ply of extruded molten material so as to assure fusion with abutting plies, and a cross-sectional configuration thereof facilitating the formation of a preliminary product configuration minimally greater than a final product configuration which would require a minimal amount of machining to acquire. In forming such plies, the shaping segment as shown in FIG. 7 includes a base portion 40a and a pair of depending portions 40b and 40c generally defining a rectangular, cross-sectional area with a small thickness thereby assuring fusion of abutting plies. FIG. 8 provides for a segment similar to the segment shown in FIG. 7 but with a base portion provided with a serrated cross-sectional configuration, providing increased abutting surface area thereby enhancing the fusion of engaging plies. FIG. 9 provides for a segment comparable to the segment shown in FIG. 7 but with the depending side portions being angled relative to the base portion thereof to form a trapazoidally configured cross-sectional area, providing an alternative side-by-side abutment arrangement for laterally aligned plies. FIG. 10 provides for a segment similar to the segment of FIG. 7 but with one of the depending portions omitted. It is contemplated that such a configuration would be effective in configuring a ply of material disposed along a portion of a perimeter of an object being formed.

FIGS. 11 and 12 illustrate the manner in which an object consisting of a strata of plies may be formed utilizing a device 25 as shown in FIGS. 1 through 4, perhaps equipped with a shaping segment as shown in FIG. 7 or 8.

The detachability of component 36 from component 35 allows the selective use of a number of different components 36 providing shaping segments of differently configured, internal cross-sections as shown in FIGS. 7 through 10 and perhaps in addition thereto. Referring to FIGS. 13 and 14, there is a provided storage rack 50 disposed in a linear array on the bed of the machine including a set holding brackets 51, each adapted to mount an applicator component 36 provided with a uniquely configured applicator component, readily accessible by extrusion component 35 mounted on the tool holder of the machine. The brackets are arranged in a row along the x-axis, each including a pair of L-shaped sidewalls 51a and 51b, a top wall 51c, and a set of front and rear walls 51d and 51e. As best as shown in FIG. 13, the front edge of the top wall 51c of each bracket is provided with a recess 51f having a suitably opposed edges for accommodating and thereby supporting the guide slots 39e and 39f of a component 36. Each of such bracket recesses is disposed along a y-axis allowing a tool holder to align parallel guide slots 39e and 39f of a mounted component 36 with the side edges of a slot 51f and displace it along the y-axis in mounting and dismounting a component 36 onto and off of a selected bracket.

In the use of a machine as described to form an object as shown in FIG. 5, with a holding bracket 51 positioned as shown in FIG. 14, the control computer of the machine suitably programmed and a heated, moldable thermoplastic material postured to be supplied through component 35, the program functions to maneuver the tool holder with component 35 mounted thereon, along the x, y and z-axes to align such component along the z-axis with a recess 39b of a selected bracket as shown in FIG. 4, and then displace it downwardly to nest component 35 in the recess of a component 36 and secure it thereto by means of the plunger and recess arrangement. With component 36 thus suitably connected to component 35 by means of spring-loaded plungers 42, 42, the execution of the inputted program will operate to supply molten thermoplastic material to device 52 and displace such device along the x, y and z-axes to form an object of thermoplastic material as shown in FIG. 5, in a manner as shown in FIGS. 11 and 12. In the course of applying such plies, components 36 of differently configured applicator segments 40 may be employed as provided in rack 50 and dictated by the inputted program. Once the rough configuration of the intended product has been completed and has set, such object can be machined to provide the finally configured product as shown in FIG. 6.

In lieu of the CNC machine being provided with a worktable displaceable along the x-axis and the tool holder being displaceable along the y and z-axes, the worktable may be fixed and the tool holder may be displaceable along the x, y and z-axes in a conventional manner. The supply of a heated pliable thermoplastic material may be provided on the bed of the machine or located exteriorly of the machine. With respect to rack 50, an electric strip heater 52 may be provided below the over reaching portions of brackets 50 for heating the components 36 resting thereon so as to be sufficiently heated for facilitating the shaping and extruding of a beam of molten material in the course of forming a stratified rough object. In addition, the machine as described in connection with the production of a stratified rough object, may be provided with a tool holder structured to accommodate either a pliable material extruder device for forming a stratified rough object or a cutting tool for machining such rough object into a finished product. Obviously, suitable control programs would be required for forming the molded preliminary object and shaping such object when cooled and solidified.

As previously indicated, the cross-sectional configuration of the material receiving channel of the shaping segment of the applicator component not only provides for a ply of sufficiently thin thickness for fusing with abutting plies but for the formation of a stratified object configuration minimally larger than the final product being produced. The availability of a number of applicator components provided with differently configured shaping segments further facilitates the formation of the rough object to be machined to a final configuration. Such capabilities not only result in a saving of material but a reduction in final machining time, thereby improving productivity.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. An additive manufacturing system, comprising:
an extruder, the extruder having an outlet nozzle;
an annular appendage surrounding the extruder, wherein at least a portion of the outlet nozzle of the extruder extends distally of the annular appendage; and
at least one applicator detachably mountable to the annular appendage, the at least one applicator comprising a first portion and a second portion, the first portion having a recess configured to receive and detachably secure the applicator to the annular appendage, and the second portion having an opening, wherein the opening is fluidly connected to the outlet nozzle of the extruder, wherein the second portion includes a base portion and at least one wall extending from the base portion, wherein the at least one wall is disposed distally of the opening when the applicator is mounted to the extruder, and wherein the extruder includes a conduit with a sidewall extending along an axis transverse with respect to a longitudinal axis of the extruder and configured to nest with and contact a sidewall of the annular appendage.

2. The system of claim 1, wherein at least one of the annular appendage or the first portion of the applicator includes at least one spring-loaded plunger, and another of the annular appendage or the first portion of the applicator includes at least one recess, wherein the spring-loaded plunger and the recess are configured to engage to detachably connect the applicator to the extruder.

3. The system of claim 1, wherein the base portion includes a plurality of walls disposed distally of the opening.

4. The system of claim 1, further comprising:
a gantry displaceable along a first axis;
a carriage mounted to the gantry and displaceable along a second axis; and
a tool holder mounted to the carriage and displaceable along a third axis, wherein the extruder is coupled to the tool holder.

5. The system of claim 1, wherein the base portion is planar.

6. The system of claim 1, wherein the at least one wall is disposed at a right angle relative the base portion.

7. The system of claim 1, wherein the at least one wall extends from the base portion at an obtuse or an acute angle.

8. The system of claim 1, wherein the base portion further comprises a plurality of teeth extending distally from the base portion, and wherein the at least one wall extends distally beyond the teeth.

9. An additive manufacturing system, comprising:
an extruder having an inlet for receiving a flowable material and an outlet nozzle;
an annular appendage disposed circumferentially around the extruder, wherein at least a portion of the outlet nozzle extends distally of the annular appendage; and
an applicator detachably mounted to the extruder, the applicator comprising a first portion and a second portion, the first portion configured to mount the annular appendage to the applicator, and the second portion having an opening in fluid communication with the outlet nozzle of the extruder, wherein the second portion includes a planar base portion and at least one wall extending out from the planar base portion, wherein the at least one wall is disposed distally of the opening when the applicator is mounted to the extruder, and wherein a distal surface of the annular appendage is seated on a surface of the first portion of the applicator.

10. The system of claim 9, wherein at least one of the annular appendage or the first portion of the applicator includes at least one spring-loaded plunger, and another of the annular appendage or the first portion of the applicator includes at least one mating recess, wherein the spring-loaded plunger and the mating recess are configured to detachably connect the applicator to the extruder.

11. The system of claim 9, further comprising:
a gantry displaceable along a first axis;
a carriage mounted to the gantry and displaceable along a second axis; and
a tool holder mounted to the carriage and displaceable along a third axis, wherein the extruder is coupled to the tool holder.

12. The system of claim 9, wherein the at least one wall is disposed at a right angle relative the base portion.

13. The system of claim 9, wherein the at least one wall is disposed at an obtuse angle or an acute angle relative to the base portion.

14. The system of claim 9, wherein the base portion further comprises a plurality of teeth extending distally from the base portion.

15. The system of claim 14, wherein the plurality of teeth are spaced equidistant from each other.

16. The system of claim 9, further comprising a plurality of walls extending out from the planar base portion.

17. The system of claim 9, further comprising a storage rack including a set of holding brackets for holding one or more applicators.

18. The system of claim 1, wherein the sidewall of the annular appendage is frusto-conical.

19. The system of claim 1, wherein the first portion includes parallel guide slots.

20. The system of claim 9, wherein the annular appendage includes a frusto-conical sidewall.

\* \* \* \* \*